April 21, 1942. M. PIER 2,280,258
MANUFACTURE OF LIQUID HYDROCARBONS
Filed March 1, 1939
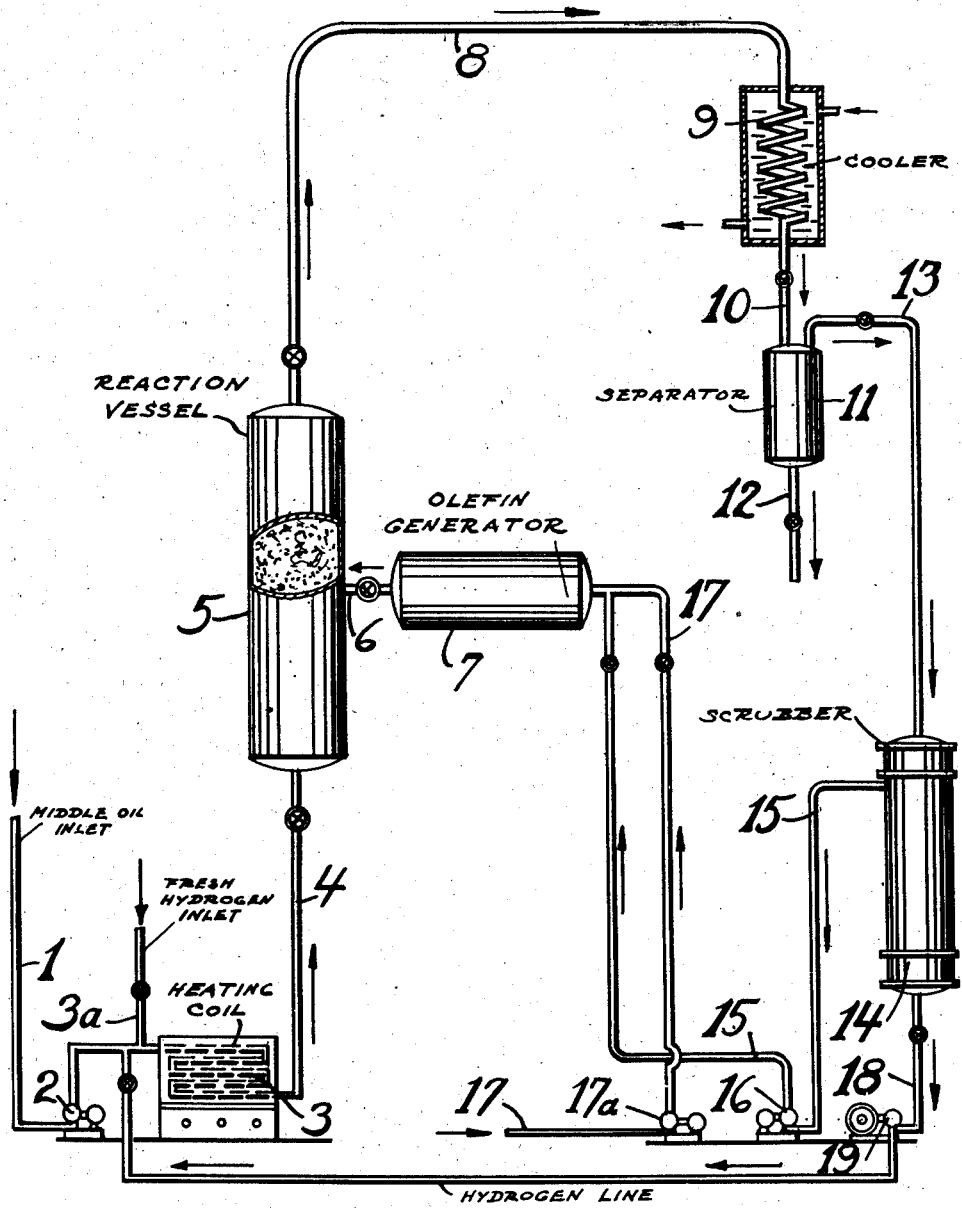
Mathias Pier Inventor
By P. L. Young Attorney Patented Apr. 21, 1942

2,280,258

UNITED STATES PATENT OFFICE 2,280,258

MANUFACTURE OF LIQUID HYDROCARBONS

Mathias Pier, Heidelberg, Germany, assignor, by mesne assignments, to William E. Currie, New York, N. Y.

Application March 1, 1939, Serial No. 259,114
In Germany March 2, 1938

5 Claims. (Cl. 196—53)

The present invention relates to the manufacture of liquid hydrocarbons.

I have found that the pressure hydrogenation of hydrocarbon oils, in particular mineral oils, can be improved to give a better yield of gasoline and middle oils or improve their nature by adding thereto, before or during the reaction, gaseous olefines.

Among initial materials for the pressure hydrogenation there may be mentioned tars, mineral oils or fractions of the same, in particular middle oils and heavy benzines.

In the pressure hydrogenation of the said substances, the conditions of temperature, as for example from 350 to 510° C., and of pressure, as for example 20 atmospheres or more, preferably from 100 to 1000 atmospheres, already known should be used and as catalysts in particular the oxides, sulphides, halides and phosphates of the heavy metals.

The gaseous olefines may, for example, be produced by splitting ethane, propane or butane. These gases are available for example in the waste gases of the pressure hydrogenation. Gaseous olefines obtained by splitting oils may also be used. In order to avoid undesirable polymerisations, the olefines are advantageously led directly after their formation to the preheater or to the reaction vessel.

The manner in which the process is carried out will be fully understood from the following description when read with reference to the accompanying drawing which is a semi-diagrammatic view in sectional elevation of one type of apparatus which is suitable for the purpose.

Referring to the drawing, numeral 1 designates a line through which middle oil is supplied. This oil is forced by means of pump 2 through a heating coil 3. Hydrogen or a gas rich in free hydrogen is also supplied to heating coil 3 through line 3a. The heated mixture of oil and hydrogen flows through line 4 into a reaction vessel 5 which contains a suitable catalytic material. Products of reaction leave reaction vessel 5 through line 8, pass through a cooler 9 and then discharge through line 10 into a separator 11 wherein gaseous and liquid products may be separated. The liquid products are removed from separator 11 through line 12. The gaseous products are removed from separator 11 through line 13 and are passed through a scrubber 14 wherein the hydrocarbon constituents are separated from the hydrogen. The hydrogen leaves the scrubbing means through line 18 and is recycled to heating coil 3. A booster compressor 19 is provided in line 18 to bring the pressure of the recycled hydrogen-containing gases up to the reaction pressure. The hydrocarbon gases which are removed from the gaseous products of reaction in scrubber 14 and which will consist essentially of propane and butane are drawn through line 15 by means of pump 16 and forced into an olefin generating means 7. The olefins generated in generating means 7 are then passed through line 6 into reaction vessel 5. Additional propane and butane obtained from an extraneous source may be introduced into olefin generating means 7 through line 17 by means of pump 17a.

In the operation of the process it is preferable to supply the olefines to places of the reaction chamber where a considerable splitting has already taken place so that split products react with the olefines with alkylation and formation of liquid condensation products. This is the case after about the first quarter and still more after the first third of the reaction zone. The olefines may also be added during or before the preheating, if desired even before the addition of hydrogen. A manner of working consists in carrying out the pressure hydrogenation in the presence of small amounts of hydrogen and under such a pressure, f. e., of from 20 to 100 atmospheres, that practically no consumption of hydrogen takes place; in this case the olefines are preferably added in the presence of hydrogen.

In some cases it is disadvantageous for the gaseous olefines to contain diolefines. It is, however, possible also to use such gases if they are brought into contact with the material to be hydrogenated during the main splitting, i. e., after about the first half of the reaction zone, because in this case practically no undesirable high boiling point polymerization products can be formed.

The olefines may be introduced in a cold or slightly heated condition; if they are introduced directly into the reaction vessel, they may serve at the same time as a cooling medium.

At the places in the reaction vessel where the olefines enter, there may be arranged a layer of catalysts which promote the alkylation and/or polymerization, as for example phosphoric acids or metal halides.

The amount of added olefine may be varied within wide limits. Generally speaking amounts of from 10 to 200 per cent by weight, with reference to the initial material to be treated, are used, and in the case of low molecular materials, as for example benzines, middle oils or the like, from about 10 to 50 per cent, and in the case of high molecular weight initial materials, as for example heavy oils, from about 30 to 300 per cent.

The following example will further illustrate the nature of this invention but the invention is not restricted to this example.

*Example*

A middle oil obtained by pressure hydrogenation from German crude oils is led together with hydrogen under a pressure of 200 atmospheres at a temperature of 410° C. over a mixture consisting of iron sulphide and tungsten sulphide applied to bleaching earth in an amount of 10 per cent. After the first third of the reaction vessel, there is introduced, in an amount of about 30 per cent by weight with reference to the oil to be treated, a gas containing olefines which has been produced under the same pressure by leading a mixture of propane and butane over a dehydrogenating catalyst at 530° C. The temperature in the reaction chamber after the introduction of the olefines is 460° C.

From 100 kilograms of middle oil, 124 kilograms of benzine and middle oil are obtained. The octane number of the benzine is higher than when it is prepared in the absence of olefines.

What I claim is:

1. In a process for the destructive hydrogenation of hydrocarbon oils which comprises passing a hydrocarbon oil with added hydrogen through a reaction zone in contact with a hydrogenation catalyst at a pressure above 20 atmospheres and a temperature of about 350° to 510° C., to produce gasoline and middle oil, the step of introducing gaseous olefines into the reaction zone in an amount of at least 10 per cent by weight of the oil treated at a point where the oil has already undergone considerable splitting.

2. A process as claimed in claim 1, which comprises providing a phosphoric acid as a polymerizing and alkylating catalyst at the point where the said olefines are introduced into the reaction zone.

3. A process as claimed in claim 1, which comprises providing a metal halide as a polymerizing and alkylating catalyst at the point where the said olefines are introduced into the reaction zone.

4. A process as claimed in claim 1, which consists in adding said olefines after about one fourth of the length of the reaction zone.

5. A process as claimed in claim 1 in which the gaseous olefines which are added in an amount of at least 10% by weight of the oil being treated are produced by the splitting of hydrocarbons and fed into the hydrogenation step immediately after their production.

MATHIAS PIER.